Feb. 8, 1966         M. G. BECK         3,233,560
TRACTION MOTOR NOSE SUPPORT
Filed July 20, 1964                  2 Sheets-Sheet 1

INVENTOR.
Merrill G. Beck
BY Ralph Hammar
Attorney

Feb. 8, 1966  M. G. BECK  3,233,560
TRACTION MOTOR NOSE SUPPORT

Filed July 20, 1964

2 Sheets-Sheet 2

INVENTOR.
Merrill G. Beck
BY Ralph Hammar
Attorney

United States Patent Office 3,233,560
Patented Feb. 8, 1966

3,233,560
TRACTION MOTOR NOSE SUPPORT
Merrill G. Beck, Erie, Pa., assignor to Lord Manufacturing Company, Erie, Pa., a corporation of Pennsylvania
Filed July 20, 1964, Ser. No. 383,672
2 Claims. (Cl. 105—136)

This invention is an improved railway traction motor nose support which simplifies the installation by preventing buckling when the support is precompressed to permit insertion between the truck and motor lugs.

Figure 1:
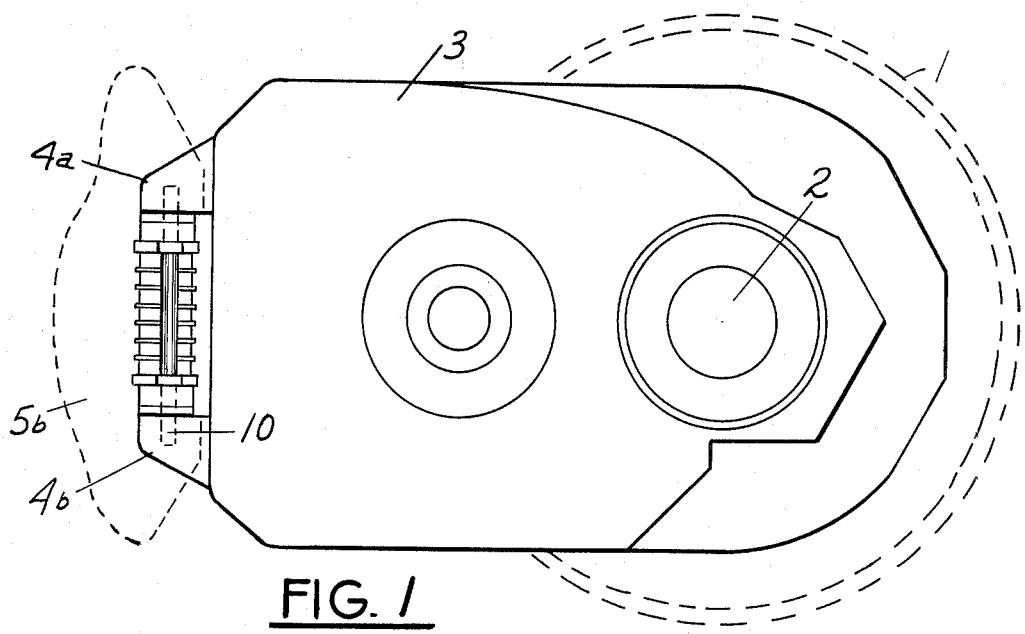
Figure 2:
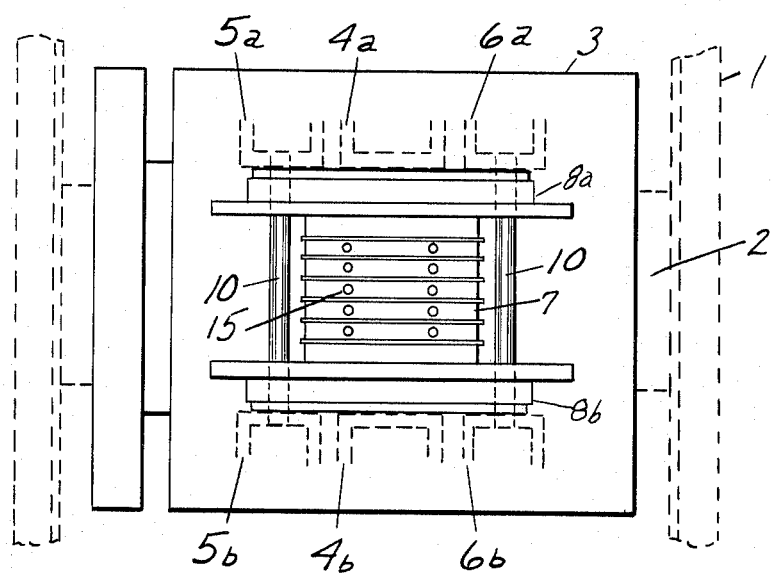
Figure 3:
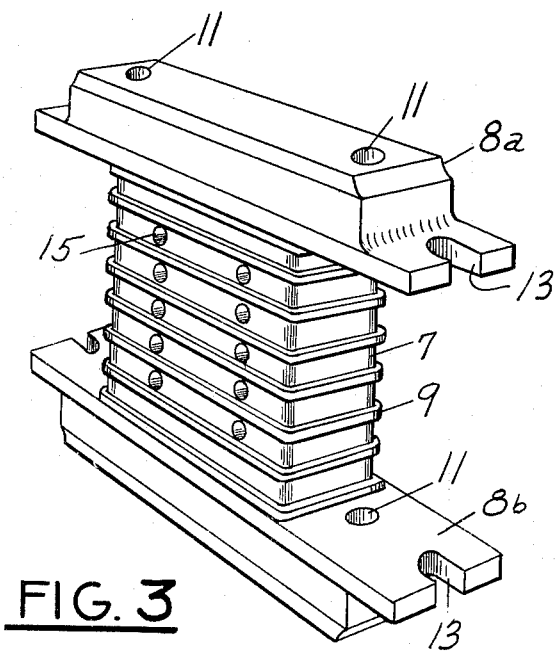
Figure 4:
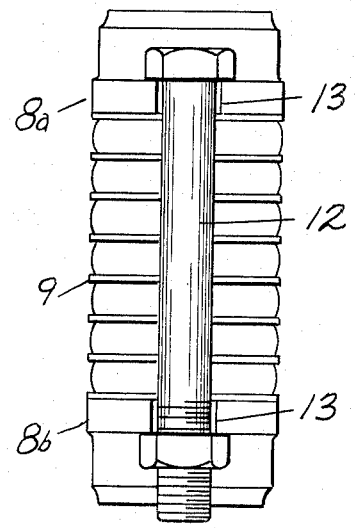
Figure 5:
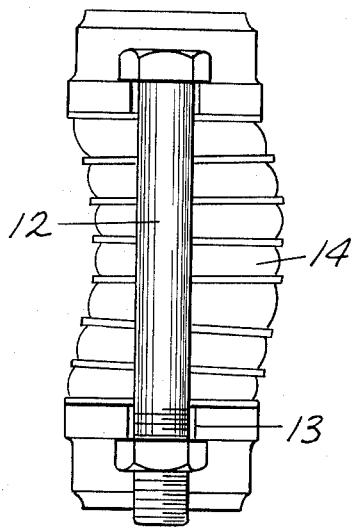

In the drawing, FIG. 1 is a diagrammatic end elevation of attraction motor, FIG. 2 is a front elevation, FIG. 3 is a perspective of the motor nose support, FIG. 4 is an end view of the FIG. 3 support precompressed for installation, and FIG. 5 is a similar view of a support without the perforations similarly precompressed for installation.

In the drawing, 1 indicates the railway wheels fixed to axle 2 and 3 indicates a traction motor driving the axle. At the front of the motor are opposed upper and lower motor nose lugs 4a and 4b arranged between opposed upper and lower truck lugs 5a, 5b and 6a, 6b. The parts so far described are of common construction.

In service, sudden load changes can, and often do, cause a wheel slip-grab condition with large forces which are cushioned by a support comprising a tall narrow column or body 7 of suitable elastomer sandwiched between and bonded to end plates 8a and 8b. The ratio of the length to thickness of the column is such that the column buckles in the thickness direction under compressive load applied lengthwise to the ends of the column. A plurality of crosswise extending shims 9 are bonded in the body at spaced intervals along its length to restrain bulging of the elastomer under compression loads. The plates 8a, 8b slidably engage the motor nose lugs 4a, 4b and are pinned to the truck lugs 5a, 6a, 5b, 6b by guide pins 10 extending between the truck lugs and through holes 11 in the plates. Relative lateral motion between the truck and motor is accommodated by sliding of the motor nose lugs 4a, 4b on the plates 8a, 8b.

Before installation, the elastomer of the support is precompressed by bolts 12 in outwardly facing notches 13 in opposite ends of the plates 8a, 8b. This provides the necessary clearance to permit insertion of the support between the motor nose and truck legs. After the support is in place, the bolts 12 are loosened and slipped out of the notches 13. When the precompression is removed, the elastomer expands and moves the plates 8a, 8b into solid engagement with the motor nose and truck lugs.

With the common nose support shown in FIG. 5, the precompression required for installation causes buckling of the elastomer in the thickness direction as shown at 14. Once the buckling starts, it increases rapidly with small increases in stress. The buckling may be aggravated by tilting of the end plates 8a, 8b. The resultant bowing of the elastomer causes difficulty in assembly or removal of the support.

To prevent unwanted bowing or buckling of the elastomer under precompression, several holes 15 are cored out in the elastomer between the shims 9. The holes extend in the thickness direction crosswise to the length of the elastomer or perpendicular to the direction of the compressive forces. While it might be thought that the holes would weaken the column and make it more susceptible to buckling, that does not happen. The shims 9 tie the various parts of the column together so that the overall column is made more stable by the holes. When the support is precompressed, the holes 15 provide space within the elastomer into which the elastomer can flow and thereby reduce the objectionable tendency of the rubber to buckle or bow.

While the holes 15 reduce the overall stiffness of the support, this can be overcome by using a stiffer elastomer.

What is claimed as new is:

1. In a traction motor having a pair of opposed upper and lower nose lugs, two pairs of opposed upper and lower truck lugs with the upper truck lugs on opposite sides of the upper nose lug and the lower truck lugs on opposite sides of the lower nose lug, a motor nose support having upper and lower end plates respectively engaging the upper and lower lugs, a guide pin extending through each pair of truck lugs and through the end plates, said end plates having an outwardly facing notch at each end of each plate, a column of elastomer having the ends of the column bonded to the end plates, preload bolts received in said notches for precompressing the end plates toward each other and placing said elastomer under precompression stress to provide clearance for the insertion of the support between the lugs, a plurality of crosswise extending shims bonded in the column at spaced intervals along its length to restrain bulging of said elastomer under said precompression stress, said column having a ratio of length to thickness resulting in a tendency to buckle in the thickness direction under said precompression stress, the improvement which comprises a plurality of openings extending in the thickness direction through the elastomer between the shims at right angles to said precompression stress in the elastomer, said openings providing space within the elastomer into which the elastomer can flow under said precompression stress and thereby reduce the buckling of the elastomer which could interfere with the installation and removal of the support.

2. In a traction motor having a pair of opposed upper and lower nose lugs, two pairs of opposed upper and lower truck lugs with the upper truck lugs on opposite sides of the upper nose lug and the lower truck lugs on opposite sides of the lower nose lug, a motor nose support having upper and lower end plates respectively engaging the upper and lower lugs, a guide pin extending between each pair of truck lugs and through the end plates, said end plates having an outwradly facing notch at each end of each plate, a column of elastomer having the ends of the column bonded to the end plates, preload bolts received in said notches for precompressing the end plates toward each other and placing the elastomer under precompression stress to provide clearance for insertion of the support between the lugs, a plurality of crosswise extending shims bonded in the column at spaced intervals along its length to restrain bulging of elastomer under said precompression stress, said column having length to thickness ratio resulting in a tendency to buckle in the thickness direction under said precompression stress, the improvement which comprises a plurality of openings distributed in the elastomer between the shims, said openings providing space within the elastomer into which the elastomer can flow under precompression stress and thereby reduce the buckling of the elastomer which could interfere with installation and removal of the support.

References Cited by the Examiner
UNITED STATES PATENTS

| | | | |
|---|---|---|---|
| 2,032,697 | 3/1936 | Golden | 280—106.5 |
| 2,196,406 | 4/1940 | Alben | 105—139 |
| 2,226,724 | 12/1940 | Kepner | 213—9 |
| 2,727,738 | 12/1955 | Lidley | 267—1 |

OTHER REFERENCES

Dynafacts, published by Lord Manufacturing Co., 1635 W. 12th St., Erie, Pa., vol. 6, No. 2, copyright 1963.

ARTHUR L. LA POINT, *Primary Examiner.*